Patented Aug. 25, 1942

2,294,217

UNITED STATES PATENT OFFICE 2,294,217

SOLUTION OF SULPHUR-CONTAINING ORGANIC CONDENSATION PRODUCTS

Emanuel Tengler, Castro-Rauxel, Westphalia, Germany, assignor to the firm Ruetgerswerke-Aktiengesellschaft, Berlin, Germany No Drawing. Application July 6, 1939, Serial No 283,129. In Germany July 14, 1938

4 Claims. (Cl. 260—32)

This invention relates to solutions of sulphur-containing organic condensation products of high molecular weight, to the use of such solutions for purifying and recovering said condensation products, and to a method of impregnating and coating materials with said solutions.

It is known in the art that sulphur-containing condensation products of high molecular weight may be obtained by the reaction of a water-soluble inorganic polysulphide with organic compounds having replaceable negative groups, or by the action of sulphur on olefin hydrocarbons. Such condensation products resemble rubber, but are distinguished from rubber by their insolubility in mineral oils and other organic liquids. Owing to their remarkable resistance to organic substances, these condensation products have found a great number of important uses. They are known, for example, under the trade-name of "Thiokol."

I have now discovered that clear solutions of these sulphur-containing condensation products can be obtained by treating them with certain liquid, aromatic compounds, whereby no essential chemical change of said condensation products takes place. Such aromatic compounds are: indene or tar distillates containing, as an essential component, indene; hydrogenated naphthalenes, such as tetrahydronaphthalene (tetralin), and decahydronaphthalene (dekalin); fractions of methylnaphthalene oil boiling between 235° and 250° C. and obtained from coaltar; cumarone and tar fractions containing, as an essential component cumarone; hydrogenated phenols, such as hydrogenated cresols, hydrogenated xylenols, cyclohexanol and methylcyclohexanol. These substances may be used as pure compounds, in the form of crude products, or in the form of mixtures containing two or more of the above mentioned compounds, or mixtures of one or more of the above mentioned compounds with other suitable substances, such as organic liquids which do not affect the dissolving capacity of the above mentioned solvents toward sulphur-containing condensation products. Tar fractions which are rich in the above mentioned solvents, may, for instance, be used.

The solvents used may contain some constituents or impurities which react with the sulphur-containing condensation products. Such solvents may preferably be subjected to a preliminary treatment in order to remove these constituents or impurities, and thus avoid a reaction between the solvent and the sulphur-containing condensation product. If, for instance, alkali-soluble compounds containing hydroxyl groups are present in the solvent, they must be removed prior to the treatment of the condensation product with such solvent.

The choice of the solvent, which is used for the preparation of a solution according to my present invention depends among other things, on the intended use of the solution obtained, inasmuch as the lower the boiling point of the solvent, the easier it is to separate it from the dissolved condensation product.

The sulphur-containing condensation product may be treated with solvents in the form of a crude condensation product, as well as an intermediate or finished product which has been obtained by molding or hardening, and also in the form of scrapped or waste material consisting of or containing the condensation products. By treating these materials with the above mentioned solvents, the condensation products are dissolved, and fillers or other admixtures, which are not soluble in the solvent, are obtained as an undissolved residue.

In preparing the solutions of the sulphur-containing condensation products, the material to be dissolved is preferably first subjected to comminution, and then mixed with the solvent under heating and stirring until a solution is obtained. I have found that generally temperatures between 100° and 120° C. are most suitable for obtaining solutions of the condensation products. Lower temperatures, however, may also be used. At these or lower temperatures the sulphur-containing condensation products can be dissolved without any essential or undesired change in their chemical structure. At higher temperatures a chemical reaction may occur between the sulphur-containing condensation products and certain solvents.

The solutions obtained are, according to their concentration, stable, more or less viscous liquids, which may be separated from the undissolved residue by filtration.

The sulphur-containing condensation products may be recovered from the solutions thus obtained in various ways. The solvent may, for instance, be removed by evaporation at ordinary or elevated temperatures, whereby the condensation product is obtained as a soft residue which becomes solid and elastic. The solvent may also be separated from the dissolved condensation product by distillation, preferably vacuum distillation or by means of steam, or by adding to the solution liquids, such as gasoline, which can be homogeneously mixed with the solvent used, but are unable to dissolve the sulphur-containing condensation products. Such liquids precipitate the dissolved condensation products which can be further purified by washing them with low-boiling organic liquids, such as acetone, ether, gasoline, or benzene, and drying them under a vacuum.

Thus the dissolution of the sulphur-containing condensation products according to my present invention, and their separation from the solvent, can be used for the purification and recovery of said condensation products in a valuable form, from mixtures or articles of any kind, which contain such condensation products.

*Example 1.*—One part by weight of a solid, plastic condensation product obtained from ethylene chloride and a water-soluble inorganic polysulphide is comminuted, and then mixed and heated under stirring with 2 to 10 parts by weight of indene to about 100° to 120° C. until a clear solution is obtained. The solvent and the condensation product can be separated by evaporating the solvent or precipitating the condensation product, whereby a soft product is obtained which shows a high elasticity after drying.

Instead of indene a coal-tar distillate, which contains about 20 to 90% of indene can be used.

The condensation product can be obtained in a manner known per se, for instance, by reacting 1 kilogram of ethylene chloride at about 70° C. with an aqueous solution of 1.740 kilograms of sodium tetrasulphide in the presence of 60 grams of freshly precipitated magnesium hydroxide. A sodium tetrasulphide solution having a specific gravity of 1.2 to 1.3 may be used. The ethylene chloride is preferably added in small portions with vigorous agitation, and the condensation product is formed as a fluid dispersion which settles out of the reaction mixture. The suspension obtained is washed out, and is coagulated with acid in known manner.

*Example 2.*—One part by weight of a finished product obtained by condensing dichloro-ether and sodium tetrasulphide in a known manner, mixing the condensation product with lampblack, and moulding and hardening the mixture to a finished product, is comminuted, mixed with 8 to 10 parts by weight of tetrahydronaphthalene and treated under stirring at 100° to 120° C. The undissolved lampblack is separated from the solution by filtration. The condensation product can be recovered from the solution, as described above, by evaporating the solvent or precipitating the dissolved condensation product. Instead of tetrahydronaphthalene the solution may be prepared in a similar manner with decahydronaphthalene or a mixture of tetrahydronaphthalene and decahydronaphthalene.

*Example 3.*—One part by weight of a finished product, which contains an olefin-polysulphide plastic obtained in a known manner from ethylene chloride and a soluble inorganic polysulphide, is pulverized and mixed with 5 parts of a methylnaphthalene-oil fraction boiling between 237° and 250° C. and obtained from coal-tar by distillation. The mixture is heated under stirring to 100°–120° C., whereby a clear solution is obtained, from which the olefin-polysulphide plastic may be recovered in the above described manner as a solid, highly elastic product.

*Example 4.*—A sulphur-containing condensation product is prepared in a known manner by the action of sulphur on ethylene under heat and pressure. The product thus obtained is pulverized. One part by weight of the pulverized product is treated at 100° to 120° C. under stirring with 10 parts of weight of a coal-tar fraction containing about 60 to 100% cumarone, until a solution is obtained. The separation of the dissolved condensation product from the solvent may be effected as described in Examples 1 to 3, whereby a highly elastic product is obtained.

*Example 5.*—One part by weight of a pulverized, plastic condensation product obtained in known manner from ethylene chloride and a water-soluble, inorganic polysulphide, such as sodium tetrasulphide, is dissolved in 10 to 15 parts by weight of cyclohexanol or methylcyclohexanol at about 120° C. under stirring. The recovery of the condensation product from the solution takes place as described in Examples 1 to 5.

In the above examples, instead of the solvents specified therein, mixtures of several solvents, or mixtures of one or more solvents with other liquids which do not affect the solubility of the sulphur-containing condensation products in said solvents, may be used.

It has also been found that the solutions of sulphur-containing condensation products obtained according to the present invention, may preferably be used for impregnating and coating purposes. The use of such solutions offers the benefit of a thorough and uniform penetration of the material to be impregnated, and of obtaining perfectly homogeneous and coherent coatings. In addition, the use of solutions according to this invention makes it possible to mix homogeneously other materials, which are soluble in the here described solvents, with the sulphur containing condensation products, and to distribute perfectly and homogeneously such additions in the coatings or impregnations which are obtained by removing the solvents from said solutions. Suitable amounts of rubber may, for instance, be dissolved in the solutions of the sulphur-containing condensation products according to the present invention. By applying such solutions as coating or impregnating liquids, and then removing the solvents, coatings, films, or the like can be obtained which contain a perfectly homogeneous mixture of the sulphur-containing condensation product and rubber. Other substances, such as artificial resins, hardening agents, or the like, which are soluble in the solvents used, may also be added to the solution.

The solvent can be removed from the coated or impregnated material by evaporation at ordinary or elevated temperature.

By the term "sulphur-containing organic condensation product" as used in the present specification and claims, is meant a condensation product of high molecular weight which is obtained by reacting a soluble, inorganic polysulphide of an alkaline metal, alkaline-earth metal or ammonium, with an organic compound having replaceable negative groups. Such organic compounds are, for instance, dihalogenated aliphatic hydrocarbons, mixed aromatic hydrocarbons having at least two halogen atoms in side chains, dihalogenated ethers, ethyl-dithio-sulphuric acids, ethyldimercaptans. Said term "sulphur-containing condensation product" also includes products obtained by the action of sulphur on olefin hydrocarbons.

I claim:

1. A solution comprising a plastic olefin-polysulfide condensation product and a volatile, organic, cyclic hydrocarbon solvent free from alkali-soluble compounds containing hydroxyl groups, said solvent being selected from the group consisting of indene; coal tar fractions containing as an essential component indene; hydrogenated naphthalenes; methyl naphthalene-oil fractions boiling between 235° and 250° C. and obtained from coal-tar.

2. The method of preparing a solution of a plastic olefin-polysulfide condensation product, which comprises heating a material containing said condensation product at temperatures up to 120° C. with a volatile, organic, cyclic hydrocarbon solvent free from alkali-soluble compounds containing hydroxyl groups, said solvent being selected from the group consisting of indene; coal tar fractions containing as an essential component indene; hydrogenated naphthalenes; methyl naphthalene-oil fractions boiling between 235° and 250° C. and obtained from coal-tar.

3. The method of preparing a solution of a plastic olefin-polysulfide condensation product, which comprises heating a material containing said condensation product at temperatures of 100° to 120° C. with a volatile, organic, cyclic hydrocarbon solvent free from alkali-soluble compounds containing hydroxyl groups, said solvent being selected from the group consisting of indene; coal tar fractions containing as an essential component indene; hydrogenated naphthalenes; methyl naphthalene-oil fractions boiling between 235° and 250° C. and obtained from coal-tar.

4. The solution of a plastic olefin-polysulfide condensation product in a volatile, organic, cyclic hydrocarbon solvent free from alkali-soluble compounds containing hydroxyl groups, said solvent being selected from the group consisting of indene, coal tar fractions containing as an essential component indene; hydrogenated naphthalenes; methyl naphthalene-oil fractions boiling between 235° and 250° C. and obtained from coal-tar.

EMANUEL TENGLER.